(12) United States Patent
Ku et al.

(10) Patent No.: US 8,105,729 B2
(45) Date of Patent: Jan. 31, 2012

(54) ELECTRODE CARTRIDGE, HYDROGEN GENERATING APPARATUS AND FUEL CELL POWER GENERATION SYSTEM HAVING THE SAME

(75) Inventors: Bo-Sung Ku, Suwon-si (KR); Jae-Hyuk Jang, Seoul (KR); Kyoung-Soo Chae, Suwon-si (KR); Jae-Hyoung Gil, Seoul (KR); Chang-Ryul Jung, Seoul (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 417 days.

(21) Appl. No.: 12/418,195

(22) Filed: Apr. 3, 2009

(65) Prior Publication Data

US 2009/0263692 A1 Oct. 22, 2009

(30) Foreign Application Priority Data

Apr. 21, 2008 (KR) ........................ 10-2008-0036478

(51) Int. Cl.
*H01M 8/04* (2006.01)
(52) U.S. Cl. ...................................................... 429/513
(58) Field of Classification Search .................. 429/523, 429/447, 450, 498, 499, 513, 512, 416, 417, 429/409, 515; 204/280, 282, 286.1, 295, 204/297.01, 278, 252, 275.1, 232
See application file for complete search history.

(56) References Cited

U.S. PATENT DOCUMENTS 6,890,410 B2 * 5/2005 Sullivan ........................ 204/258
2008/0169188 A1 * 7/2008 Gil et al. ....................... 204/258

FOREIGN PATENT DOCUMENTS

KR 10-0790680 1/2008

* cited by examiner

*Primary Examiner* — Javaid Nasri
(74) *Attorney, Agent, or Firm* — McDermott Will & Emery LLP (57) ABSTRACT

An electrode cartridge, a hydrogen generating apparatus and a fuel cell power generation system equipped with the electrode cartridge and hydrogen generating apparatus are disclosed. The electrode cartridge can include an anode configured to generate electrons in an electrolyte solution, a cathode configured to generate hydrogen from the electrolyte solution by receiving the electrons at the anode, a liquid-gas separation membrane, which is disposed to surround the anode and the cathode, configured to separate the hydrogen from the electrolyte solution and discharge the hydrogen to the outside, and a support configured to support the liquid-gas separation membrane for preventing an expansion of the liquid-gas separation membrane. The electrode cartridge of the present invention can prevent an effect of electrolyte solution flowing backwards when generating hydrogen as well as an effect of electrolyte solution leak when moving.

31 Claims, 5 Drawing Sheets

ELECTRODE CARTRIDGE, HYDROGEN GENERATING APPARATUS AND FUEL CELL POWER GENERATION SYSTEM HAVING THE SAME

CROSS-REFERENCE TO RELATED APPLICATIONS

This application claims the benefit of Korean Patent Application No. 10-2008-0036478 filed with the Korean Intellectual Property Office on Apr. 21, 2008, the disclosure of which is incorporated herein by reference in its entirety.

BACKGROUND

1. Technical Field

The present invention relates to an electrode cartridge, a hydrogen generating apparatus and a fuel cell power generation system equipped with the electrode cartridge and hydrogen generating apparatus.

2. Description of the Related Art

A fuel cell is an apparatus that converts the chemical energy of fuel (hydrogen, LNG, LPG, etc.) and air directly into electricity and heat, by means of electrochemical reactions. In contrast to conventional power generation technologies, which employ the processes of burning fuel, generating vapor, driving turbines, and driving power generators, the utilization of fuel cells does not entail combustion processes. As such, the fuel cell is a relatively new technology for generating power that offers high efficiency and few environmental problems.

Examples of fuel cells being researched for application to portable electronic devices include the polymer electrolyte membrane fuel cell (PEMFC), which uses hydrogen as fuel, and the direct liquid fuel cell, such as the direct methanol fuel cell (DMFC), which uses liquid fuel directly. The PEMFC provides a high output density, but requires a separate apparatus for supplying hydrogen. Using a hydrogen storage tank for supplying hydrogen can result in a large volume and can require special care in handling and maintenance.

Methods used in generating hydrogen for a polymer electrolyte membrane fuel cell (PEMFC) can mainly include a method of utilizing the oxidation of aluminum, a method of utilizing the hydrolysis of metal borohydrides, and a method of utilizing reactions on metal electrodes. Among these, the method of using metal electrodes efficiently regulates the rate of hydrogen generation. This is a method in which the electrons obtained when magnesium in the electrode is ionized to $Mg^{2+}$ ions are moved through a wire and connected to another metal object, where hydrogen is generated by the dissociation of water. The amount of hydrogen generated can be regulated, as it is related to the distance between electrodes and the size of the electrodes.

However, when generating hydrogen by a method of generating hydrogen according to the related art, there is a problem of an electrolyte solution flowing backwards to the fuel cell stack. As such, there is also a problem of the electrolyte solution leaking out when an electrolyte bath containing the electrolyte solution is overturned.

SUMMARY

An aspect of the invention provides an electrode cartridge, a hydrogen generating apparatus and a fuel cell generation system equipped with the electrode cartridge and hydrogen generating apparatus, in which the backflow of an electrolyte solution is prevented during the generation of hydrogen, and an effect of an electrolyte solution leak is prevented when moving place to place.

Another aspect of the invention provides an electrode cartridge. The electrode cartridge can include an anode configured to generate electrons in an electrolyte solution, a cathode configured to generate hydrogen from the electrolyte solution by receiving the electrons at the anode, a liquid-gas separation membrane, which is disposed to surround the anode and the cathode, configured to separate the hydrogen from the electrolyte solution and discharge the hydrogen to the outside, and a support configured to support the liquid-gas separation membrane for preventing an expansion of the liquid-gas separation membrane.

Certain embodiments of the invention may include one or more of the following features.

The liquid-gas separation membrane can include a frame configured to support the liquid-gas separation membrane for maintaining space inside the liquid-gas separation membrane.

The liquid-gas separation membrane can comprises a plurality of unit liquid-gas separation membranes, each of the unit liquid-gas separation membranes being supported by the frame. The support can be a board, where an opening formed on the board to allow the hydrogen to pass.

The electrode cartridge can further include an absorption layer disposed to surround the anode and the cathode and configured to absorb the electrolyte solution carried in the hydrogen.

A plurality of liquid-gas separation membranes can be disposed apart from one another, and the absorption layer can be interposed between the liquid-gas separation membranes.

The liquid-gas separation membrane can be made of a material comprising a hydrophobic substance having multiple pore formed therein.

The liquid-gas separation membrane can be made of a material comprising poly tetra fluoro ethylene (PTFE).

The electrode cartridge can further include a connection terminal, which is electrically connected to the anode and the cathode and configured to electrically connect the anode and the cathode to an outside device.

Yet another aspect of the invention provides a hydrogen generating apparatus. The hydrogen generating apparatus can include a housing having a hydrogen outlet formed therein, an electrode cartridge configured to generate hydrogen and positioned inside the housing to allow the hydrogen to pass through the hydrogen outlet, and a cover coupled to the housing such that the housing is sealed, in which the electrode cartridge comprises an anode configured to generate electrons in an electrolyte solution, a cathode configured to generate the hydrogen from the electrolyte solution by receiving the electrons at the anode, a liquid-gas separation membrane, which is disposed to surround the anode and the cathode, configured to dissociate the hydrogen from the electrolyte solution and discharge the hydrogen to the outside; and a support configured to support the liquid-gas separation membrane for preventing an expansion of the liquid-gas separation membrane.

Certain embodiments of the invention may include one or more of the following features.

The liquid-gas separation membrane can include a frame configured to support the liquid-gas separation membrane for maintaining space inside the liquid-gas separation membrane.

The liquid-gas separation membrane can comprises a plurality of unit liquid-gas separation membranes, each of the unit liquid-gas separation membranes being supported by the frame. The support can be a board, where an opening formed on the board to allow the hydrogen to pass.

The hydrogen generating apparatus can further include an absorption layer disposed to surround the anode and the cathode and configured to absorb the electrolyte solution carried in the hydrogen.

A plurality of liquid-gas separation membranes can be disposed apart from one another, and the absorption layer can be interposed between the liquid-gas separation membranes.

The liquid-gas separation membrane can be made of a material comprising a hydrophobic substance having multiple pore formed therein.

The liquid-gas separation membrane can be made of a material comprising poly tetra fluoro ethylene (PTFE).

The hydrogen generating apparatus can further include a connection-terminal, which is electrically connected to the anode and the cathode and configured to electrically connect the anode and the cathode to an outside device.

The hydrogen generating apparatus can further include a control circuit, which is electrically connected to the connection terminal, configured to control electrical conduction of the anode and the cathode.

The hydrogen generating apparatus can further include a sealing material interposed between the housing and the cover such that the hydrogen is prevented from leaking.

Still another aspect of the invention provides a fuel cell generation system. The fuel cell generation system can include a housing having a hydrogen outlet formed therein, an electrode cartridge configured to generate hydrogen and positioned inside the housing to allow the hydrogen to pass through the hydrogen outlet, a cover coupled to the housing such that the housing is sealed, and a fuel cell configured to generate electrical energy by converting chemical energy of the hydrogen generated at the electrode cartridge, in which the electrode cartridge comprises an anode configured to generate electrons in an electrolyte solution, a cathode configured to generate the hydrogen from the electrolyte solution by receiving the electrons at the anode, a liquid-gas separation membrane, which is disposed to surround the anode and the cathode, configured to separate the hydrogen from the electrolyte solution and discharge the hydrogen to the outside, and a support configured to support the liquid-gas separation membrane for preventing an expansion of the liquid-gas separation membrane.

Certain embodiments of the invention may include one or more of the following features.

The liquid-gas separation membrane can include a frame configured to support the liquid-gas separation membrane for maintaining space inside the liquid-gas separation membrane.

The liquid-gas separation membrane can comprises a plurality of unit liquid-gas separation membranes, each of the unit liquid-gas separation membranes being supported by the frame. The support can be a board, where an opening formed on the board to allow the hydrogen to pass.

The fuel cell generation system can further include an absorption layer disposed to surround the anode and the cathode and configured to absorb the electrolyte solution carried in the hydrogen.

A plurality of liquid-gas separation membranes can be disposed apart from one another, and the absorption layer can be interposed between the liquid-gas separation membranes. The liquid-gas separation membrane can be made of a material comprising a hydrophobic substance having multiple pore formed therein.

The liquid-gas separation membrane can be made of a material comprising poly tetra fluoro ethylene (PTFE).

The fuel cell generation system can further include a connection terminal, which is electrically connected to the anode and the cathode and configured to electrically connect the anode and the cathode to an outside device.

The fuel cell generation system can further include a control circuit, which is electrically connected to the connection terminal and configured to control electrical conduction of the anode and the cathode.

The fuel cell generation system can further include a sealing material that is interposed between the housing and the cover such that the hydrogen is prevented from leaking.

Additional aspects and advantages of the present invention will be set forth in part in the description which follows, and in part will be obvious from the description, or may be learned by practice of the invention.

DETAILED DESCRIPTION

An electrode cartridge, a hydrogen generating apparatus and a fuel cell generation system equipped with the electrode cartridge and hydrogen generating apparatus according to certain embodiments of the present invention will be described below in more detail with reference to the accompanying drawings. Those components that are the same or are in correspondence are rendered the same reference numeral regardless of the figure number, and redundant explanations are omitted.

It is to be noted that coupling of components encompasses not only the direct physical engaging between the components but also the engaging of the components with another element interposed in-between such that the components are in contact with the other element.

Figure 1:
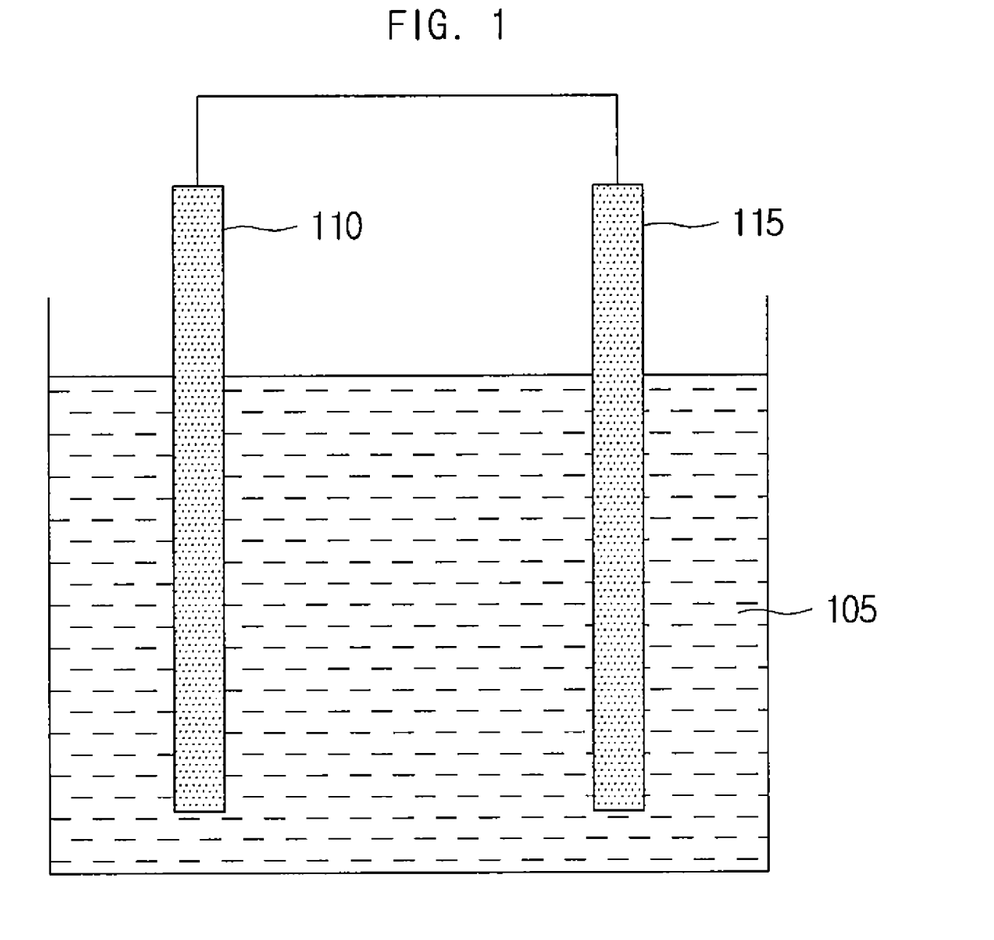
FIG. 1 is a diagram illustrating how an electrode cartridge generates hydrogen in accordance with an embodiment of the present invention.
Figure 2:
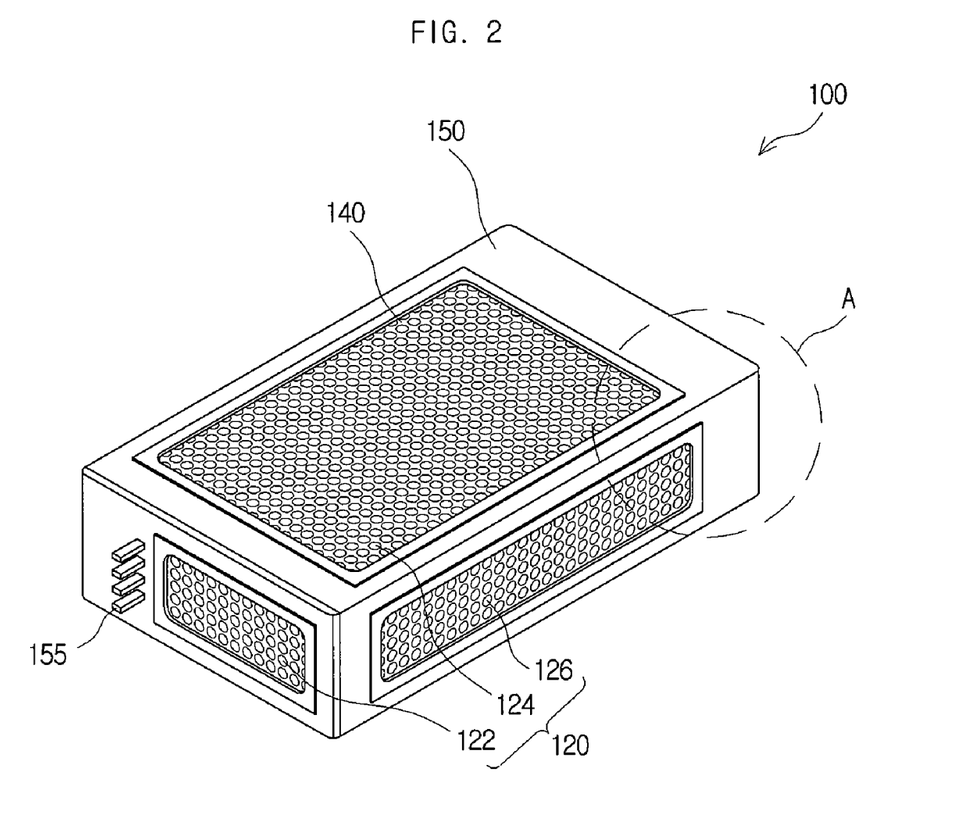
FIG. 2 is a perspective view illustrating an electrode cartridge in accordance with an embodiment of the present invention.
Figure 3:
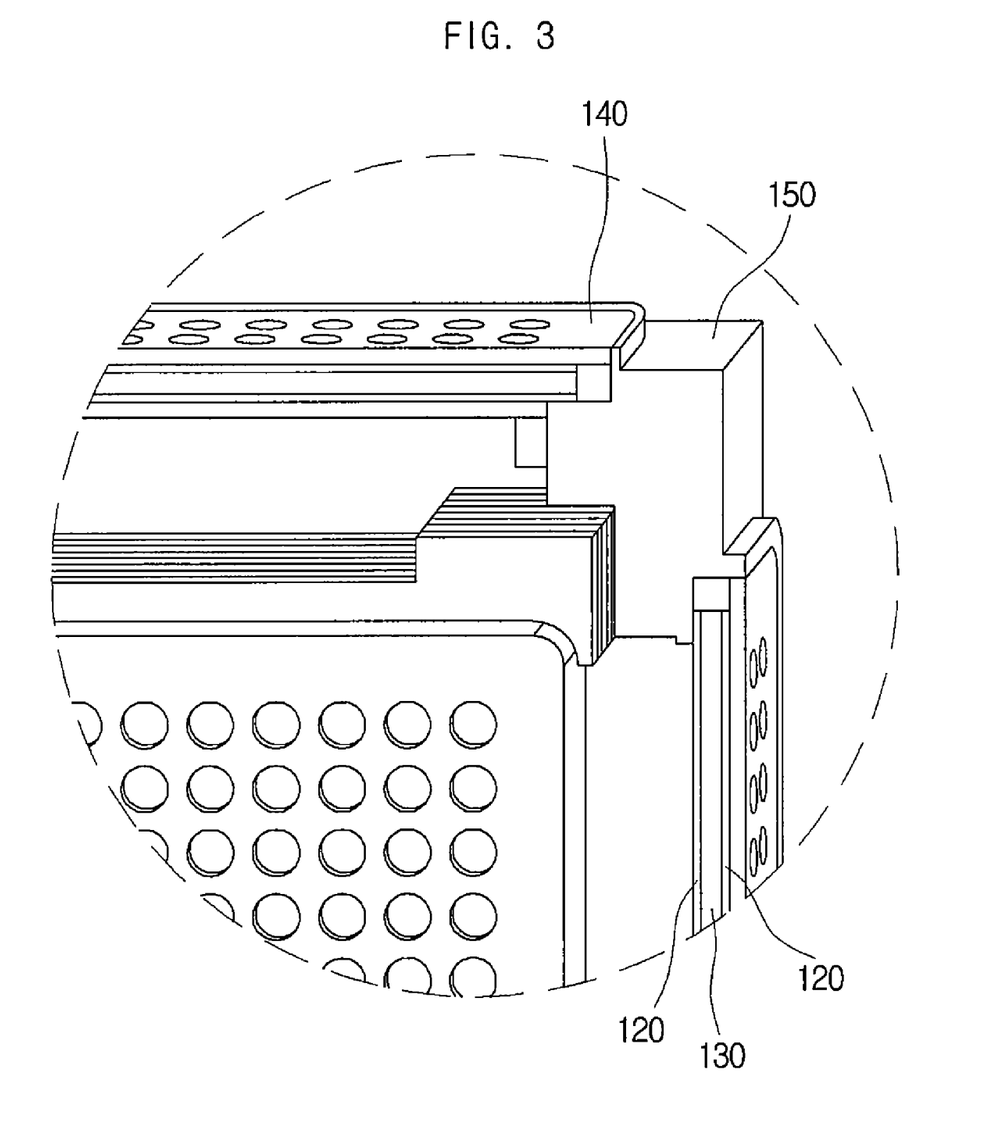
FIG. 3 is a partial sectional view illustrating the part A of FIG. 2.

FIG. 1 is a diagram illustrating how an electrode cartridge generates hydrogen in accordance with an embodiment of the present invention, and FIG. 2 is a perspective view illustrating an electrode cartridge in accordance with an embodiment of the present invention. FIG. 3 is a partial sectional view illustrating the part A of FIG. 2.

Illustrated in FIGS. 1 to 3 are an electrode cartridge 100, an electrolyte solution 105, an anode 110, a cathode 115, a liquid-gas separation membrane 120, unit liquid-gas separation membranes 122, 124, 126, an absorption layer 130, a support 140, a frame 150, and a connection terminal 155. The present embodiment presents an electrode cartridge 100 that can increase the efficiency of hydrogen generation. The reverse flow of an electrolyte solution carried in hydrogen can be prevented during the generation of hydrogen by arranging a liquid-gas separation membrane 120 wrapping an anode 110 and a cathode 115, and an effect of an electrolyte solution leak may be prevented when the electrolyte solution flows.

The present embodiment also presents the electrode cartridge 100, which can be used without concern about explosion regardless of pressure increased in the liquid-gas separation membrane 120 during the generation of hydrogen by having a support 140 for preventing an expansion of the liquid-gas separation membrane 120.

Likewise, the present embodiment also presents the electrode cartridge 100, in which the hydrogen generating efficiency is improved and the expansion of the electrode cartridge 100 is efficiently prevented by using the support 140 that is a board having openings formed therein to allow the hydrogen to pass.

By maintaining space inside the liquid-gas separation membrane 120 using a frame 150, the present embodiment also presents the electrode cartridge 100, which protects the anode 110 and the cathode 115 positioned inside the liquid-gas separation membrane 120, and in which the electrolyte solution 105 is easily injected into the liquid-gas separation membrane 120. In addition, this embodiment also provides the electrode cartridge 100, in which the liquid-gas separation membrane comprises a plurality of unit liquid-gas separation membranes 122, 124, 126, each of the unit liquid-gas separation membranes being supported by the frame. Thus, the electrode cartridge 100 can be efficiently implemented through a process of manufacturing. Furthermore, the electrode cartridge 100 is presented, which absorb moisture carried in hydrogen by positioning the absorption layer 130 between the liquid-gas separation membranes 120.

Referring to FIG. 1, The following descriptions will refer to a reaction occurring at the anode 110 and the cathode 115. The anode 110 is an active electrode, which can generate electrons inside the electrolyte solution 105. The anode 110 can be made of magnesium (Mg), for example, and due to the difference in ionization tendency between the anode 110 and hydrogen, the anode 110 can release electrons into the electrolyte solution 105 and be oxidized into magnesium ions ($Mg^{2+}$).

The electrons generated thus can travel to the cathode 115 that is electrically connected with the anode 110. Therefore, the anode 110 gets dissipated while generating electrons. Also, as it will be described later, the anode 110 can be made of a metal having a greater tendency of ionizing than the material used for the cathode 115.

The cathode 115 is an inactive electrode, which is not be expended, unlike the anode 110, and thus the cathode 115 can be implemented with a lower thickness than the anode 110. The cathode 115 can be positioned inside the electrolyte solution 105 and receive the electrons generated at the anode 110 to generate hydrogen in the electrolyte solution 105. The cathode 115 can be made of stainless steel, for example, and react with the electrons to generate hydrogen. That is, the chemical reaction at the cathode 115 involves the electrolyte solution 105 being dissociated, after receiving the electrons from the anode 110, to form hydrogen at the cathode 115. The reactions at the anode 110 and the cathode 115 can be represented by the following Reaction Scheme 1.

[Reaction Scheme 1]

Anode 110:

$$Mg \longrightarrow Mg^{2+} + 2e^-$$

Cathode 115:

$$2H_2O + 2e^- \longrightarrow H_2 + 2(OH)^-$$

Overall Reaction:

$$Mg + 2H_2O \longrightarrow Mg(OH)_2 + H_2$$

A compound such as LiCl, KCl, NaCl, $KNO_3$, $NaNO_3$, $CaCl_2$, $MgCl_2$, $K_2SO_4$, $Na_2SO_4$, $MgSO_4$, AgCl, or a combination thereof can be used in the electrolyte solution, and the electrolyte solution can contain hydrogen ions.

The liquid-gas separation membrane 120, which surrounds the anode 110 and the cathode 115, can separate hydrogen generated at the cathode 115 in the electrolyte solution and discharge the hydrogen to the outside. The liquid-gas separation membrane 120 can be comprised of a material comprising a hydrophobic substance, i.e. poly tetra fluoro ethylene (PTFE), which has multiple pore formed therein, and can be disposed to surround the anode 110 and the cathode 115. Therefore, when hydrogen is generated by the electrolyte solution 105 having been injected into the liquid-gas separation membrane 120, the hydrogen generated can be dissociated from the electrolyte solution 105 by the liquid-gas separation membrane 120 and discharged to the outside through the surfaces of the liquid-gas separation membrane 120. In this way, the backflow of electrolyte solution carried in hydrogen is prevented during the generation of hydrogen, and an effect of the electrolyte solution leak is prevented when the electrolyte solution flows. As a result, the hydrogen generating efficiency of the hydrogen generating apparatus can be improved.

Likewise, the absorption layer 130 can absorb the electrolyte solution 105 carried in the hydrogen by being positioned to wrap the anode 110 and the cathode 115. That is, the remaining moisture in the hydrogen can be removed with greater effectiveness, by absorbing any remaining electrolyte solution 105 carried in the hydrogen dissociated from the electrolyte solution through the liquid-gas separation membranes 120, which are arranged for being separated from each other.

The frame 150 is for supporting the liquid-gas separation membranes 120 for maintaining space inside the liquid-gas separation membranes 120. That is, the volume surrounded by the liquid-gas separation membranes 120 can be remained in a certain form with no deduction, and thus the anode 110 and the cathode 115 positioned inside can be protected from any outside pressure, and the electrolyte solution 105 can be more effectively injected into the liquid-gas separation membranes 120.

The liquid-gas separation membrane can comprise a plurality of unit liquid-gas separation membranes 122, 124, 126, each of the unit liquid-gas separation membranes supported by the frame. By bonding each of the unit liquid-gas separation membranes 122, 124, 126 to the frame 150 respectively, the electrode cartridge 100 can be manufactured more efficiently since each of the unit liquid-gas separation membranes 122, 124, 126 is disposed to surround the anode 110 and the cathode 115.

The support 140 can support the liquid-gas separation membranes 120 to prevent the expansion of the liquid-gas separation membranes 120. Because the expansion of the liquid-gas separation membranes 120 can be prevented by covering the surfaces of the liquid-gas separation membranes 120 using the support 140, the electrode cartridge can be used with no concern of explosion even though pressure in the liquid-gas separation membrane 120 increases when generating hydrogen, and there is no effect on outside devices because the volume is determined by the frame 150 so that it may not expand. Here, the support 140 can be a board having the openings formed therein to allow hydrogen to pass through. By using the board having the openings formed therein as the support 140, the expansion of the liquid-gas separation membrane 120 can be effectively prevented, and thus the safety and efficacy of the electrode cartridge 100 can be improved at the same time by allowing the hydrogen to pass through the openings. Here, the connection terminal 155 is electrically connected to the anode 110 and the cathode 115 so that the anode 110 and the cathode 115 can be electrically connected to an outside device. That is, the connection terminal 155, which is electrically connected to the anode 110 and the cathode 115, and is projected far into outside through the frame 150, can be electrically connected to the outside device.

An outside device, which is electrically connected to the connection terminal 155, can control electrical conduction of the anode 110 and the cathode 115, thereby controlling the time consumed for generating hydrogen and an amount of hydrogen produced.

Here, the outside device can be a part of the fuel cell generation system, which will be described in an embodiment of the fuel cell generation system below. Next, an embodiment of a hydrogen generating apparatus according to another aspect of the present invention will be described.

Figure 4:
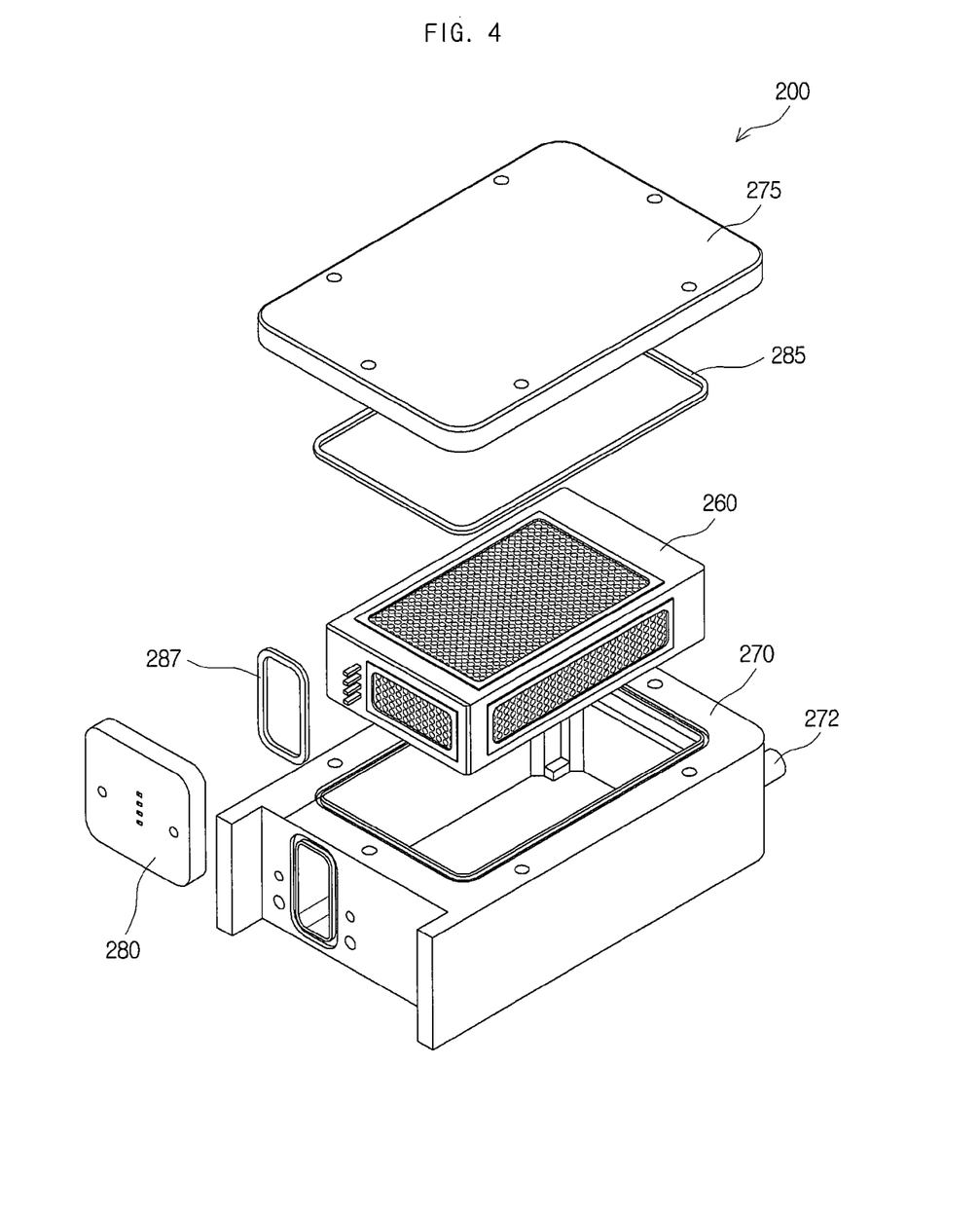
FIG. 4 is a detailed perspective view illustrating a hydrogen generating apparatus in accordance with another embodiment of the present invention.

FIG. 4 is a detailed perspective view illustrating an embodiment of a hydrogen generating apparatus according to another aspect of the invention. Illustrated in FIG. 4 are a hydrogen generating apparatus 200, an electrode cartridge 260, a housing 270, a hydrogen outlet 272, a cover 275, a control unit 280 and a sealing material 285.

This embodiment presents a hydrogen generating apparatus 200, in which the efficiency and safety of hydrogen generation can be improved by disposing the liquid-gas separation membrane 120 (of FIG. 2) to surround the anode 110 (of FIG. 1) and the cathode 115 (of FIG. 1) and by having the support 140 (of FIG. 2) to prevent an expansion of the liquid-gas separation membrane 120 (of FIG. 2), and in which the hydrogen generated can be used by discharging towards one direction through a hydrogen outlet 272 more simply and effectively. In this embodiment, the electrode cartridge 260 is substantially the same as or similar to those of the embodiment described and thus will not be described again. The descriptions hereinafter will focus on the housing 270, hydrogen outlet 272, cover 275, control unit 280 and sealing material 285, which form the differences from the previously described embodiment.

The electrode cartridge 260 generating hydrogen may be disposed inside the housing 270, and the hydrogen outlet 272 may be formed on the top of the housing. Thus, the hydrogen generated at the electrode cartridge 260 can be supplied to an outside device, i.e. a fuel cell, through the hydrogen outlet 272 of the housing 270.

Here, after the electrode cartridge 260 is inserted, a cover 275 can be coupled to the housing 270 to cover and seal the inside, and a sealing material 285 can be interposed between the cover 275 and the housing 270 such that the hydrogen generated at the electrode cartridge 260 can be prevented from leaking. The control unit 280, which is configured to control electrical conduction of the anode 110 (of FIG. 1) and the cathode 115 (of FIG. 1) by being electrically connected to the connection terminal 155 (of FIG. 2) can be connected to the bottom side of the housing 270 for being electrically connected to the connection terminal 155 (of FIG. 2) of the electrode cartridge 260. Therefore, the time of hydrogen generation and the quantity of the hydrogen generated at the cathode 115 (of FIG. 1) can be controlled through controlling electrical conduction by using the control unit 280.

In other words, the control unit 280 can increase an amount of electrons flowing from the anode 110 (of FIG. 1) to the cathode 115 (of FIG. 1) when the demands for hydrogen is great at an outside device, i.e. a fuel cell, and reduce the amount of electrons flowing from the anode 110 (of FIG. 1) to the cathode 115 (of FIG. 1) when the demands for hydrogen is small.

For example, the control unit 280 can be comprised of adjustable resistance, and by changing values of the adjustable resistance, the amount of electrons flowing between the anode 110 (of FIG. 1) and the cathode 115 (of FIG. 1) can be controlled, or the control unit 280 can be comprised of on/off switch, and by controlling the timing of on/off, the amount of electrons flowing between the anode 110 (of FIG. 1) and the cathode 115 (of FIG. 1) can be controlled. The sealing material 287 can be interposed between the housing 270 and the control unit 280 such that hydrogen generated at the electrode cartridge 260 can be supplied into the outside device, i.e. a fuel cell, without the hydrogen leak. Next, an embodiment of a fuel cell generation system according to yet another aspect of the present invention will be described.

Figure 5:
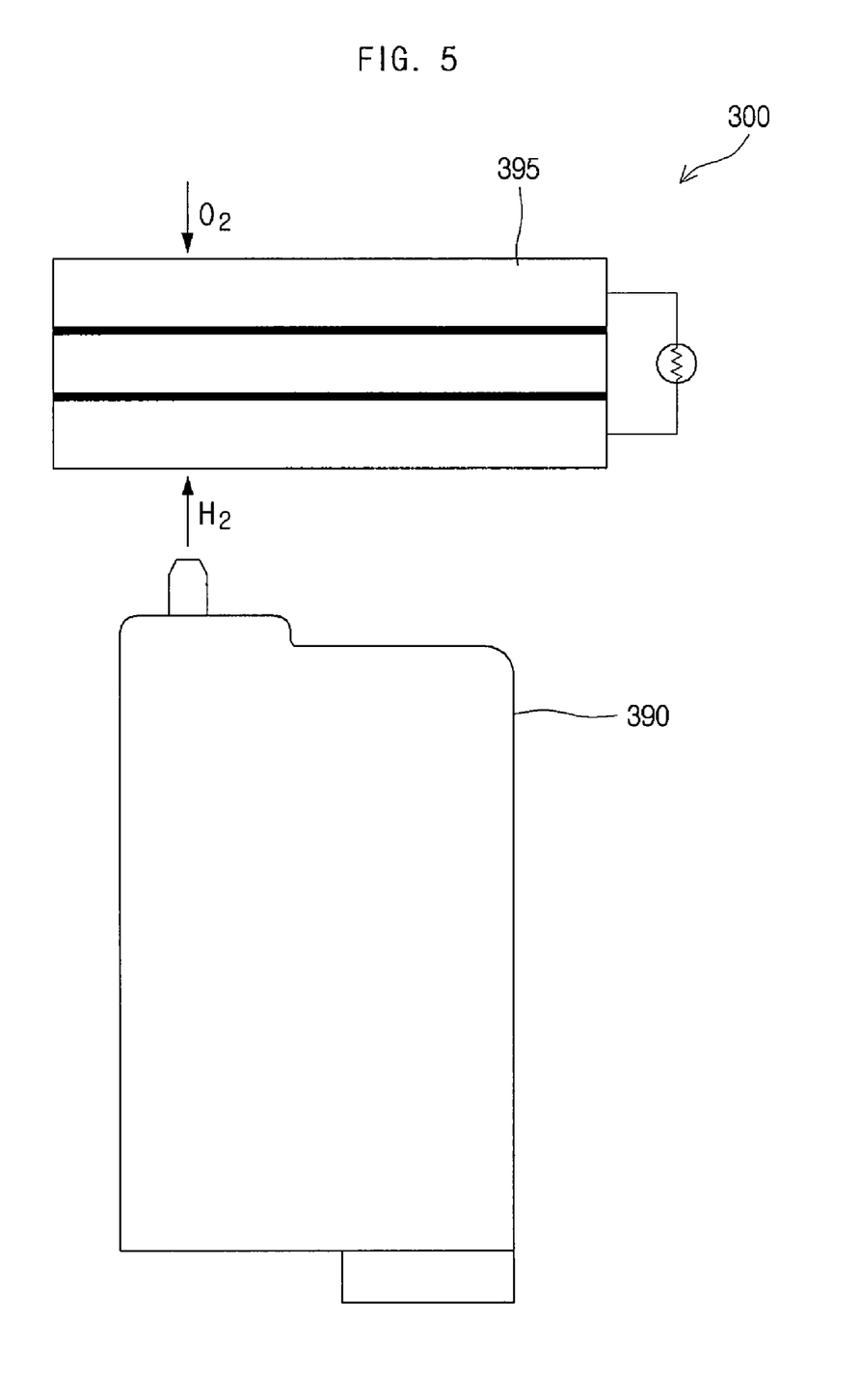
FIG. 5 is a diagram illustrating a fuel cell generation system in accordance with yet another embodiment of the invention.

FIG. 5 is a diagram illustrating an embodiment of a fuel cell generation system according to yet another aspect of the present invention. Illustrated in FIG. 5 are a fuel cell generation system 300, a hydrogen generating apparatus 390 and a fuel cell 395.

This embodiment presents a fuel cell generation system 300, in which the efficacy and safety of hydrogen generation can be improved by arranging the liquid-gas separation membrane 120 (of FIG. 2) surrounding the anode 110 (of FIG. 1) and the cathode 115 (of FIG. 1) and by having the support 140 (of FIG. 2) for preventing the expansion of the liquid-gas separation membrane 120 (of FIG. 2), and in which the electrical energy can be generated more simply and effectively since replacement of the electrical cartridge is simple.

In this embodiment, the hydrogen generating apparatus 390 is substantially the same as or similar to those of the embodiment described and thus will not be described again. The descriptions hereinafter will focus on the fuel cell 395, which form the differences from the previously described embodiment.

The fuel cell 395 can convert chemical energy of the hydrogen generated at the electrode cartridge 100 (of FIG. 2) to produce electrical energy. That is, the pure hydrogen of low humidity generated at the electrode cartridge 100 (of FIG. 2) can be moved to the fuel electrode of the fuel cell 395, where the chemical energy of the hydrogen generated at the hydrogen generating apparatus 390 described above can be converted into electrical energy to produce a direct current.

According to certain aspects of the invention as set forth above, the backflow of the electrolyte solution, which may occur while generating hydrogen, can be prevented as well as the electrolyte solution leak, which may occur while moving place to place, thereby increasing the efficiency of hydrogen generation and electrical energy generation of the electrode cartridge, the hydrogen generating apparatus and the fuel cell generation system equipped with the electrode cartridge and hydrogen generating apparatus.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention. As such, many embodiments other than those set forth above can be found in the appended claims.

What is claimed is:

1. An electrode cartridge comprising:
   an anode configured to generate electrons in an electrolyte solution;
   a cathode configured to generate hydrogen from the electrolyte solution by receiving the electrons at the anode;
   a liquid-gas separation membrane disposed to surround the anode and the cathode, the liquid-gas separation membrane configured to separate the hydrogen from the electrolyte solution and discharge the hydrogen to an outside; and
   a support configured to support the liquid-gas separation membrane for preventing an expansion of the liquid-gas separation membrane,
   wherein the liquid-gas separation membrane does not discharge the electrolyte solution injected into the liquid-gas separation membrane and discharge only the hydrogen to the outside.

2. The electrode cartridge of claim 1, further comprising a frame configured to support the liquid-gas separation membrane for maintaining space inside the liquid-gas separation membrane.

3. The electrode cartridge of claim 2, wherein the liquid-gas separation membrane comprises a plurality of unit liquid-gas separation membranes, each of the unit liquid-gas separation membranes being supported by the frame.

4. The electrode cartridge of claim 1, wherein the support is a board, an opening formed on the board to allow the hydrogen to pass.

5. The electrode cartridge of claim 1, further comprising an absorption layer disposed to surround the anode and the cathode and configured to absorb the electrolyte solution carried in the hydrogen.

6. The electrode cartridge of claim 5, wherein a plurality of liquid-gas separation membranes are disposed apart from one another, and the absorption layer is interposed between the liquid-gas separation membranes.

7. The electrode cartridge of claim 1, wherein the liquid-gas separation membrane is made of a material, comprising a hydrophobic substance having multiple pore formed therein.

8. The electrode cartridge of claim 7, wherein the liquid-gas separation membrane is made of a material comprising poly tetra fluoro ethylene (PTFE).

9. The electrode cartridge of claim 1, further comprising a connection terminal electrically connected to the anode and the cathode and configured to electrically connect the anode and the cathode to an outside device.

10. A hydrogen generating apparatus comprising:
    a housing having a hydrogen outlet formed therein;
    an electrode cartridge configured to generate hydrogen and positioned inside the housing to allow the hydrogen to pass through the hydrogen outlet; and
    a cover coupled to the housing such that the housing is sealed, wherein the electrode cartridge comprises:
      an anode configured to generate electrons in an electrolyte solution;
      a cathode configured to generate the hydrogen from the electrolyte solution by receiving the electrons at the anode;
      a liquid-gas separation membrane disposed to surround the anode and the cathode, the liquid-gas separation membrane configured to separate the hydrogen from the electrolyte solution and discharge the hydrogen to an outside; and
      a support configured to support the liquid-gas separation membrane for preventing an expansion of the liquid-gas separation membrane,
      wherein the liquid-gas separation membrane does not discharge the electrolyte solution injected into the liquid-gas separation membrane and discharges only the hydrogen to the outside.

11. The hydrogen generating apparatus of claim 10, further comprising frame configured to support the liquid-gas separation membrane for maintaining space inside the liquid-gas separation membrane.

12. The hydrogen generating apparatus of claim 11, wherein the liquid-gas separation membrane comprises a plurality of unit liquid-gas separation membranes, each of the unit liquid-gas separation membranes being supported by the frame.

13. The hydrogen generating apparatus of claim 10, wherein the support is a board, an opening formed on the board to allow the hydrogen to pass.

14. The hydrogen generating apparatus of claim 10, further comprising an absorption layer disposed to surround the anode and the cathode and configured to absorb the electrolyte solution carried in the hydrogen.

15. The hydrogen generating apparatus of claim 14, wherein a plurality of liquid-gas separation membranes are disposed apart from one another and the absorption layer is interposed between the liquid-gas separation membranes.

16. The hydrogen generating apparatus of claim 10, wherein the liquid-gas separation membrane is made of a material comprising a hydrophobic substance having multiple pore formed therein.

17. The hydrogen generating apparatus of claim 16, wherein the liquid-gas separation membrane is made of a material comprising poly tetra fluoro ethylene (PTFE).

18. The hydrogen generating apparatus of claim 10, further comprising a connection terminal electrically connected to the anode and the cathode and configured to electrically connect the anode and the cathode to an outside device.

19. The hydrogen generating apparatus of claim 18, further comprising a control circuit electrically connected to the connection terminal and configured to control electrical conduction of the anode and the cathode.

20. The hydrogen generating apparatus of claim 10, further comprising a sealing material interposed between the housing and the cover such that the hydrogen is prevented from leaking.

21. A fuel cell generation system comprising:
    a housing having a hydrogen outlet formed therein;
    an electrode cartridge configured to generate hydrogen and positioned inside the housing to allow the hydrogen to pass through the hydrogen outlet;
    a cover coupled to the housing such that the housing is sealed; and
    a fuel cell configured to generate electrical energy by converting chemical energy of the hydrogen generated at the electrode cartridge, wherein the electrode cartridge comprises:
      an anode configured to generate electrons in an electrolyte solution;
      a cathode configured to generate the hydrogen from the electrolyte solution by receiving the electrons at the anode;
      a liquid-gas separation membrane disposed to surround the anode and the cathode, the liquid-gas separation membrane configured to separate the hydrogen from the electrolyte solution and discharge the hydrogen to an outside; and a support configured to support the liquid-gas separation membrane for preventing an expansion of the liquid-gas separation membrane, wherein the liquid-gas separation membrane does not discharge the electrolyte solution injected into the liquid-gas separation membrane and discharges only the hydrogen to the outside.

22. The fuel cell generation system of claim 21, further comprising a frame configured to support the liquid-gas separation membrane for maintaining space inside the liquid-gas separation membrane.

23. The fuel cell generation system of claim 22, wherein the liquid-gas separation membrane comprises a plurality of unit liquid-gas separation membranes, each of the unit liquid-gas separation membranes being supported by the frame.

24. The fuel cell generation system of claim 21, wherein the support is a board, an opening formed on the board to allow the hydrogen to pass.

25. The fuel cell generation system of claim 21, further comprising an absorption layer disposed to surround the anode and the cathode and configured to absorb the electrolyte solution carried in the hydrogen.

26. The fuel cell generation system of claim 25, wherein a plurality of liquid-gas separation membranes are disposed apart from one another and the absorption layer is interposed between the liquid-gas separation membranes.

27. The fuel cell generation system of claim 21, wherein the liquid-gas separation membrane is made of a material comprising a hydrophobic substance having multiple pore formed therein.

28. The fuel cell generation system of claim 27, wherein the liquid-gas separation membrane is made of a material comprising poly tetra fluoro ethylene (PTFE).

29. The fuel cell generation system of claim 21, further comprising a connection terminal electrically connected to the anode and the cathode and configured to electrically connect the anode and the cathode to an outside device.

30. The fuel cell generation system of claim 29, further comprising a control circuit electrically connected to the connection terminal and configured to control electrical conduction of the anode and the cathode.

31. The fuel cell generation system of claim 21, further comprising a sealing material interposed between the housing and the cover such that the hydrogen is prevented from leaking.

* * * * *